United States Patent [19]

Gold et al.

[11] Patent Number: 4,644,548
[45] Date of Patent: Feb. 17, 1987

[54] FREE ELECTRON LASER WITH TAPERED AXIAL MAGNETIC FIELD

[75] Inventors: Steven H. Gold, New Carrollton; Henry P. Freund, Bowie, both of Md.

[73] Assignee: The United States of America as represented by the Secretary of the Navy, Washington, D.C.

[21] Appl. No.: 573,751

[22] Filed: Jan. 25, 1984

[51] Int. Cl.$^4$ ............................................... H01S 3/00
[52] U.S. Cl. ............................................ 372/2; 372/37
[58] Field of Search ................................... 372/2, 37

[56] References Cited

U.S. PATENT DOCUMENTS

| | | |
|---|---|---|
| 3,398,376 | 8/1968 | Hirshfield . |
| 3,822,410 | 7/1974 | Madey . |
| 4,283,687 | 8/1981 | Madey et al. ............................. 372/2 |
| 4,331,936 | 5/1982 | Schlesinger et al. ..................... 372/2 |

OTHER PUBLICATIONS

S. H. Gold et al., "Study of Gain, Bandwidth, and Tunability of a Millimeter-Wave Free-Electron Laser Operating in the Collective Regime", Phys. Fluids 26(9), Sep. 1983; pp. 2683–2688.
S. H. Gold et al., "Study of Gain, Bandwidth, and Tunability of a Millimeter-Wave Free-Electron Laser"; Digest of Technical Papers of the Seventh International Conference on Infrared and Millimeter Waves, 14–18, Feb. 1983, Marszille, France.
S. H. Gold et al., "Studies of Gain, Feedback, and Efficiency Enhancement in a Millimeter-Wave Free-Electron Laser"; IEEE Internation Conference on Plasma Science, May 23–25, 1983; San Diego, Calif.; pp. 26.
"Gain, Bandwidth, and Tunability of a High Power Millimeter-Wave Free-Electron Laser", by S. H. Gold, W. M. Black, V. L. Granatstein, H. P. Freund, and A. K. Kinkead, presented at Beams'83—The Fifth International Workshop on High Power Particle Beams, 12–14, Sep. 1983, San Francisco, Calif.
"Breakdown of the Atmosphere by Emission from a Millimeter-Wave Free-Electron Maser", by S. H. Gold, W. M. Black, V. L. Granatstein and A. K. Kinkead, Appl. Phys. Lett. 43, 922 (1983).
"Radiation Growth in a Millimeter-Wave Free-Electron Laser Operating in the Collective Regime", by S. H. Gold, W. M. Black, H. P. Freund, V. L. Granatstein, and A. K. Kinkead, Phys. Fluids, to be published.
"Studies of Gain and Spectrum of a Millimeter-Wave Free-Electron Laser Operating in the Collective Regime", by S. H. Gold, W. M. Black, H. P. Freund, V. L. Granatstein, and P. C. Efthimion, presented at the Fourth Workshop on Free-Electron Laser Devices, 27 Jun.–1, Jul. 1983, East-Sound, Wash.

*Primary Examiner*—Leon Scott, Jr.
*Attorney, Agent, or Firm*—Sol Sheinbein; Andrew M. Lesniak

[57] ABSTRACT

A free electron laser for emitting coherent radiation. The laser includes a wiggler magnet for producing a spatially periodic magnetic field in a drift region into which relativistic electrons are injected in a predetermined direction. An axial magnet is provided which generates an axial magnetic field parallel to the above predetermined direction. The axial field is tapered in field strength within a uniform wiggler region, wherein the wiggler field is of uniform and constant magnitude, such that the tapered field acts to oppose the change in axial electron velocity resulting from the free electron laser interaction as electrons travel through the drift region. The tapered axial field acts to enhance power output and efficiency.

12 Claims, 9 Drawing Figures

| NATURE OF AXIAL MAGNETIC FIELD | CASE |
|---|---|
| DECREASING TAPER | CASE 1, WHERE $\Omega_0 < k_w v_z$ (GROUP I)<br>CASE 2, WHERE $\Omega_0 > k_w v_z$ (GROUP II) AND $\bar{\Phi} < 0$ |
| INCREASING TAPER | CASE 3, WHERE $\Omega > k_w v_z$ (GROUP II) AND $\bar{\Phi} > 0$ |
FIG. 7
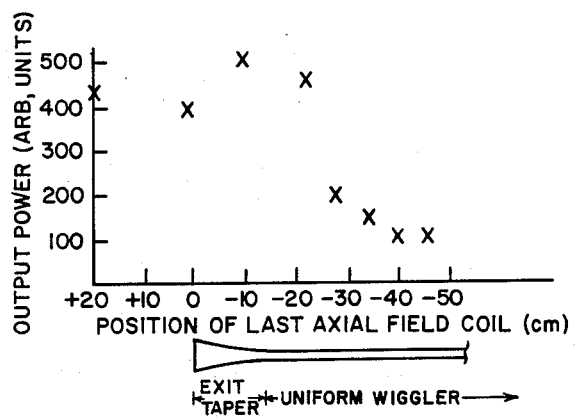
FIG. 8
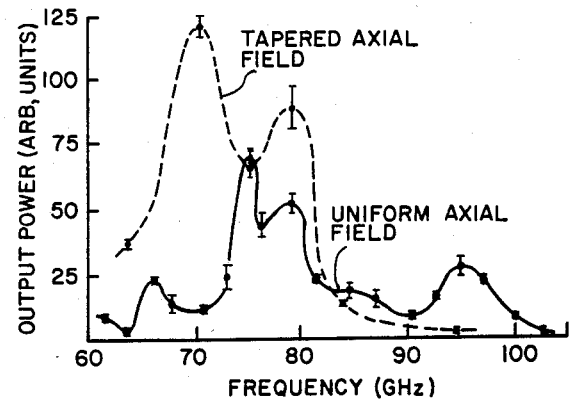
FIG. 9

FREE ELECTRON LASER WITH TAPERED AXIAL MAGNETIC FIELD

BACKGROUND OF THE INVENTION

This invention relates to lasers, and more particularly to free electron lasers.

In a free electron laser, a relativistic electron beam is injected through a spatially periodic wiggler field. The electrons are deflected by the wiggler field, and are caused to spontaneously emit radiation. This radiation and the wiggler field then combine in an interaction region to bunch and decelerate the electrons to produce gain. An independent signal wave may also be introduced which is amplified in the interaction as described above. In addition, many free electron lasers, particularly those designed to operate at moderate voltage (0.5-2.0 MeV) and with high current density (greater than 100 A), make use of a uniform axial magnetic field in the interaction region, in addition to the above wiggler field. The axial magnetic field helps form and confine the electron beam, and can also provide gyroresonant enhancement of the effects of the wiggler magnetic field.

An important problem with these devices is that their intrinsic efficiency is often fairly low. Previous methods of improving the efficiency of the free electron laser include tapering the strength and/or period of the wiggler magnet as described in U.S. Pat. No. 4,283,687 to John M. J. Madey et al. Another prior technique of improving efficiency utilizes a depressed collector to recover energy from the spent electron beam. The above techniques of improving efficiency are mechanically and technically complex. In respect to the tapered wiggler magnet, typically a bifilar wiggler coil must be specially flared at its ends to achieve the desired tapered wiggler field.

SUMMARY OF THE INVENTION

It is, therefore, an object of the present invention to provide a free electron laser which is highly efficient.

It is also an object of this invention to provide a free electron laser having a means of improving efficiency which is relatively simple to construct and implement.

The above objects are realized in a free electron laser having a tapered axial magnetic field. The free electron laser of the present invention includes a wiggler magnet for producing a spatially periodic field in a drift region through which relativistic electrons are injected in a predetermined direction. An axial magnet is provided for generating an axial magnetic field parallel to the predetermined direction which is tapered in a uniform wiggler region, wherein the wiggler magnetic field is of uniform and constant magnitude. The axial field is tapered such that the field acts to change the fraction of the total velocity in the predetermined, or axial, direction so as to oppose the continuous change in electron beam axial velocity which results from the free electron laser (FEL) interaction as the beam travels through the drift region.

The tapered axial field described above provides higher power output and efficiency than prior lasers. In addition, the tapered nature of the axial field may be achieved simply by, for example, positioning the end of a solenoidal coil to achieve the desired taper, as described in an illustrated embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a table summarizing cases where either an increasing tapered axial field or a decreasing tapered field achieves efficiency enhancement.

FIG. 8 illustrates graphically a plot of output power versus position of the last axial field coil for an example of the present invention having a decreasing tapered axial field. Here, the last axial field coil corresponds to the effective end of the axial magnet.

FIG. 9 is a graphical comparison of power outputs obtained for a laser constructed according to the present invention have a tapered axial field, and a laser having a uniform axial field.

DESCRIPTION OF THE PREFERRED EMBODIMENTS

A free electron laser is described herein which includes a tapered axial magnetic field in a uniform wiggler region, wherein the wiggler field is of uniform and constant magnitude.

Figure 1:
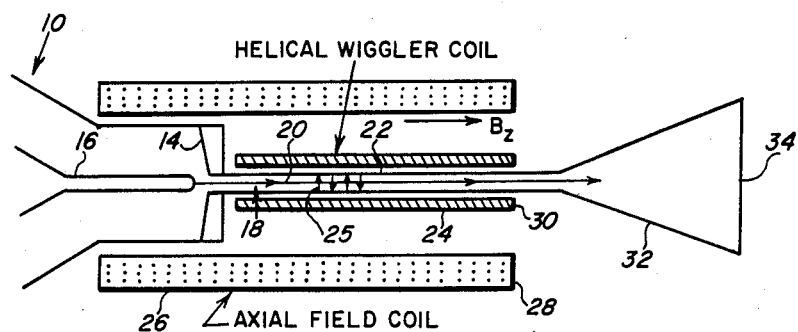
FIG. 1 is a schematic cross-sectional view of a free electron laser having a decreasing tapered axial field.

Referring now to FIG. 1, there is shown a schematic cross sectional view of one embodiment of the present invention. An electron source, denoted generally at 10, includes an anode 14 and cathode 16 of an apertured foilless diode. Cathode 16 and anode 14 are provided a voltage pulse by, for example, a conventional short pulse accelerator (not shown), such that a beam of relativistic electrons 20 are injected into drift region 18 in a predetermined direction. As shown, drift region 18 is within a drift tube 22. Electron source 10 typically operates at voltages of about 50 keV −5 MeV so as to produce an electron beam having a current density of, for example, several amps to several thousand amps. It should be understood that other alternative sources of electrons could be substituted for the above described arrangement.

A conventional bifilar helical wiggler coil 24 connected to a suitable pulsed or D.C. current supply (not shown) is provided, which is coaxially positioned in respect to drift region 18 and drift tube 22 so that the coil 24 surrounds drift region 18. Wiggler coil 24 serves to generate a spatially periodic wiggler magnetic field, denoted schematically at 25, in the drift region 18. Wiggler field 25 deflects electrons traveling in drift region 18, causing the electrons to spontaneously emit radiation in a manner well known in the art. This radiation then interacts with the electron beam 20 in the presence of the wiggler field 25 to produce gain. Typical wiggler field strengths that may be utilized range from, for example, a fraction of a kG to several kG.

In addition, the wiggler field produced within drift region 18 is of uniform and constant magnitude within a region hereinafter called the uniform wiggler region. This region will be discussed in more detail below.

The wiggler field may be generated by several alternatives to the helical coil 24 described above. For example, a suitable wiggler field could be produced by a set of permanent magnets of alternating polarities arranged in series, magnetic diffusion, or by an electromagnetic wave.

An axial magnetic field $B_z$ is generated parallel to the predetermined direction of the electron beam from source 10 by an axial field coil 26. Axial field coil 26 may conveniently comprise a solenoidal coil having a series of wire windings connected to a constant power source (not shown). As shown, axial field coil 26 is coaxially positioned in respect to drift tube 22 and drift region 18 such that coil 26 surrounds drift region 18. The axial magnetic field generated by axial field coil 26 helps to form and confine the electron beam, and also provides gyroresonant enhancement of the effects of the wiggler magnetic field. Typically, the axial magnetic field generated is from about 6 kG to about 20 kG.

In the illustrated embodiment of FIG. 1, the end of the axial field coil 26 furthest from electron source 10, shown at 28, is positioned in respect to wiggler coil 24 such that a tapered axial field exists within the uniform wiggler region referred to above. This tapered axial field is a decreasing tapered field. In other words, electrons in the electron beam 20 experience a progressively decreasing axial magnetic field strength as they travel within the uniform wiggler region. Considerable efficiency enhancement occurs for the above described decreasing tapered axial field for two particular cases later described in detail.

As shown in the illustrated embodiment of FIG. 1, end 28 of axial field coil 26 is positioned axially near the end 30 of wiggler coil 24. A decreasing taper in field strength occurs naturally near the end of a solenoid. Thus, by positioning the end 30 of axial coil 26 as shown, the desired tapered axial field exists within the uniform wiggler region.

The decreasing tapered axial field may be produced by means other than that described above, such as by a set of coils whose winding density varies along the coil, or by a set of permanent magnets.

The laser of FIG. 1 also includes a microwave horn 32, conveniently taking the form of a smooth outward taper of drift tube 22. Horn 32 functions to lower the power density and also serves as a collimator. Radiation generated via the free electron interaction within drift tube 22 may be transmitted through a window 34 of, for example, polyethylene or quartz.

Figure 2:
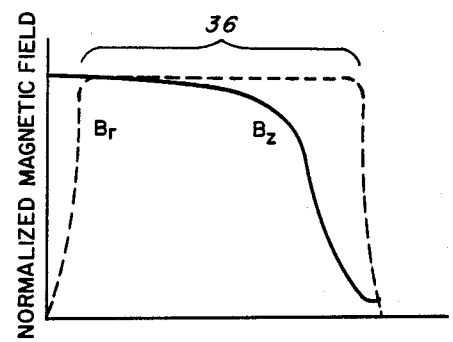
FIG. 2 is a graph wherein wiggler magnetic field strength $B_r$ and axial field strength $B_z$ are plotted for the apparatus shown in FIG. 1.

Referring now to FIG. 2, there is shown a graph wherein the axial field strength $B^z$ and wiggler field strength $B^r$ are plotted for the FIG. 1 embodiment. The uniform wiggler region is denoted generally at 36. As shown, the axial field strength $B^z$ decreases within the uniform wiggler region 36, thereby causing the dramatic efficiency enhancement according to the present invention for the two cases described below. It should also be understood that the present invention is not restricted to the particular field variation shown in FIG. 2. The axial field, however, must be tapered within the uniform wiggler region.

Figure 3:
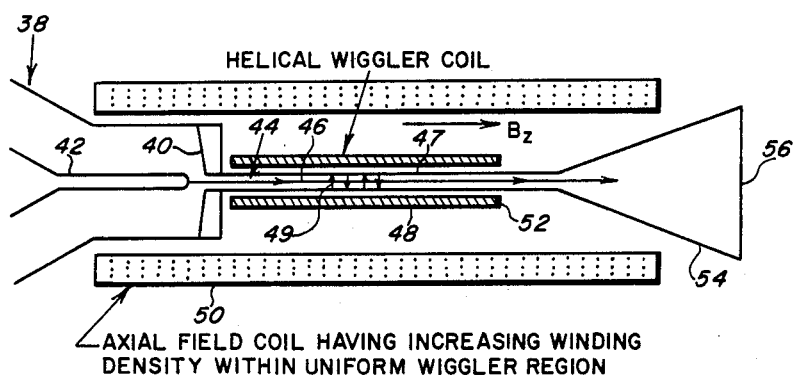
FIG. 3 is a schematic representation of a free electron laser having an increasing tapered axial magnetic field.

Turning now to FIG. 3, there is shown an alternate embodiment of the present invention having an increasing tapered axial field. This embodiment includes an electron source 38 having an anode 40 and cathode 42 for injecting a beam of electrons 46 into a drift region 44 within a drift tube 47; a wiggler coil 48 for producing a spatially periodic field 49; and a horn 54 having a window 56. The above features are similar to those described in connection with the embodiment of FIG. 1.

Axial field coil 50 is a solenoidal coil coaxially positioned in respect to drift region 18. As shown, axial coil 50 extends well beyond end 52 of wiggler coil 48. An increasing tapered field within the uniform wiggler region is generated by means of an axial coil winding density which increases in the direction of travel of the electron beam 46. This increasing density feature is preferably provided in only a portion of axial field coil 50 within the uniform wiggler region. The increasing tapered field described above acts to enhance laser efficiency for one particular case, described in detail below.

Figure 4:
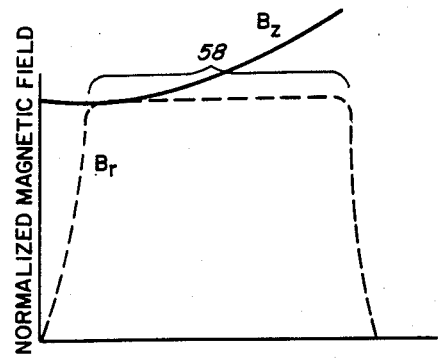
FIG. 4 shows a plot of $B_r$ and $B_z$ for the apparatus shown in FIG. 3.

Referring now to FIG. 4, there is shown a graph wherein the axial magnetic field strength $B_z$ and the wiggler magnetic field strength $B_r$ are plotted for the apparatus of FIG. 3. As shown, the axial field strength $B_z$ gradually increases within uniform wiggler region 58. Thus, electrons in electron beam 46 experience a progressively increasing axial field strength as they travel within the uniform wiggler region 58.

It should be understood that although the embodiments shown in FIGS. 1 and 3 are of the superradiant type of free electron laser, oscillator and amplifier configurations are also possible.

The cases for which efficiency enhancement occurs will now be considered. First, however, some background information and term definitions will be briefly discussed.

For a free electron laser having a helical wiggler and an axial magnetic field, the linear growth rate is given by the solution of the dispersion relation $$(k+k_w-k-\omega/v_z)(k+k_w+k-\omega/v_z)(k-k_+)(k-k_-) \cong \tfrac{1}{2}\beta_w^2 k^2 \omega(\omega-\Omega_o-kv_z)/\beta_z c^2,$$

where $\beta_w \equiv v_w/v_z$, $v_w = \Omega_w v/(\Omega_o - k_w v_z)$, $v_z$ is the axial electron velocity parallel to the axial field, and which is that fraction of the total velocity in the axial, or the above-mentioned predetermined direction, $k_w (\equiv 2\pi/\lambda_w$ where $\lambda_w$ is the wiggler period) is the wiggler wavenumber, $\Omega_{o,w} \equiv |e\beta_{z,r}/\gamma mc|$, $B_z$, and $B_r$ denote the amplitudes of the axial and wiggler fields, $\gamma \equiv (1-v^2/c^2)^{-\frac{1}{2}}$ is the relativistic factor, $(\omega, k)$ represents the frequency and wavevector of the radiation, and $$K_\pm = \frac{1}{2v_z}[\omega(1+\beta_z)-\Omega_0] \pm \tfrac{1}{2}[\Delta K^2 + 2(\omega_b^2/\gamma c^2)(\Omega_0/\omega\beta_z)]^{\frac{1}{2}}.$$

In addition, $\omega_b \equiv (4\pi e^2 n_b/m)^{\frac{1}{2}}$ is the beam plasma frequency, $n_b$ is the beam electron density, $\Delta k \equiv [\Omega_o - \omega(1-\beta_z)]/v_z$, $\beta_z \equiv v_z/c$ $k^2 \equiv \omega_b^2 \Phi/(\gamma\gamma_z^2 v_z^2)$, $\gamma_z = (1-v_z^2/c^2)^{-\frac{1}{2}}$ and $$\Phi \equiv 1 - \beta_w^2 \gamma_z^2 \Omega_o/[(1+\beta_w^2)\Omega_o - k_w V_z].$$

The solutions to the dispersion relation given above is discussed in detail in an article by H. P. Freund, P.

Sprangle, D. Dillenburg, E. H. da Jornada, R. S. Sheider, and B. Liberman, Phys. Rev., Vol. A26, p. 2004 (1982), whose disclosure is herein incorporated by reference.

It is observed that $(v_w, v_z)$ cannot be chosen arbitrarily. The energy conservation requirement implies that $v_z^2 + v_w^2 = (1-\gamma^{-2})c^2$, which yields two distinct classes of solutions corresponding to $\Omega_o < k_w v_z$ (Group I orbits) and $\Omega_o > k_w v_z$ (Group II orbits).

Figure 5:
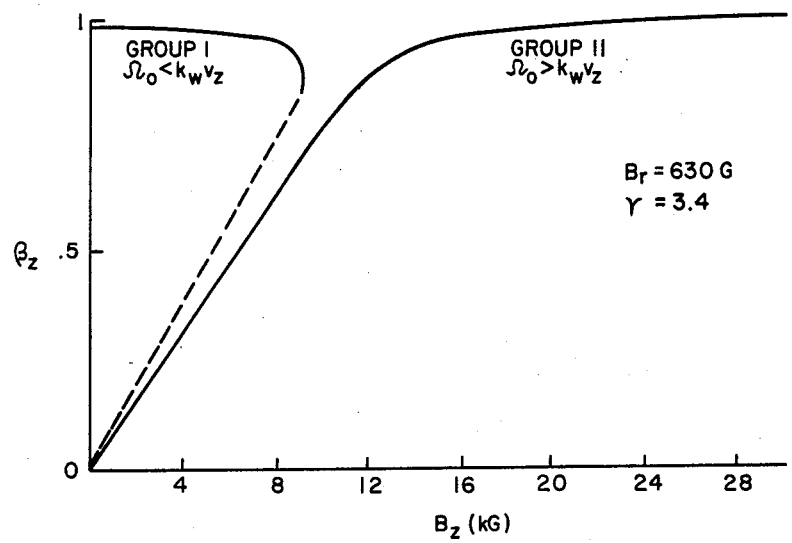
FIG. 5 is a graph wherein $\beta_z$ (or $v_z/c$, where $v_z$ is electron axial velocity) is plotted as a function of $B_z$ for Group I and Group II orbits, described in detail below.

Referring now to FIG. 5, there is shown a graph which plots $\beta_z$ versus $\beta_z$ for Group I and Group II orbits, where $B_r = 630G$ and $\gamma = 3.4$. The dashed portion of the curves plotted indicate mathematical solutions which do not physically occur.

Figure 6:
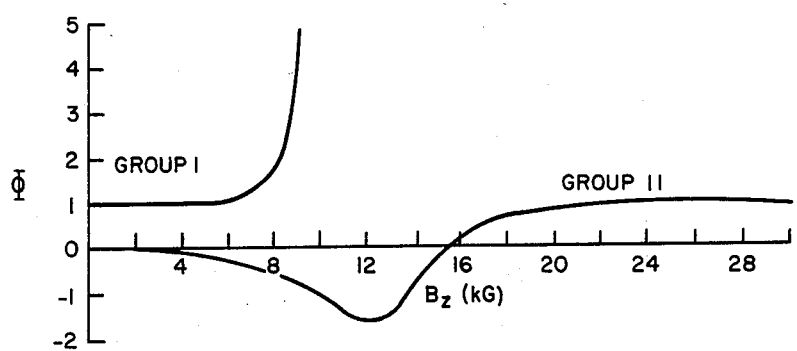
FIG. 6 is a graphical representation of the value $\Phi$, later discussed, as a function of $B^z$ for Group I and Group II orbits.

FIG. 6 shows a graph of $\Phi$ versus $B_z$ for Groups I and II. As shown, for Group I, $\Phi$ is positive. For Group II, however, $\Phi$ is both positive and negative for different values of $B_z$.

Three cases will now be considered, wherein the cases are defined as follows. Case 1 is defined as Group I $(\Omega_o < k_w v_z)$; case 2 is defined as Group II $(\Omega_o > k_w v_z)$ where $\Phi < 0$; and case 3 is Group II, where $\Phi > 0$.

It has been found that efficiency enhancement occurs for a decreasing tapered field within the uniform wiggler region as described in connection with the apparatus of FIG. 1, in the case 1 and 2 situations. As to case 3, an increasing tapered field within the uniform wiggler region, as described in reference to FIG. 3, is necessary to achieve the desired efficiency enhancement.

In FIG. 7, a table is shown which summarizes the above described conditions under which efficiency enhancement occurs.

To better understand the conditions noted above, the tapered axial field's effect on $v_z$ will be discussed.

As to case 1, where $\Omega_o < k_w v_z$ (Group I), an electron traveling through the drift region loses energy via the free electron laser (FEL) interaction. Consequently, $v_z$ and $\beta_z$ $(v_z/c)$ tend to decrease. As noted above, a decreasing tapered axial field is provided according to the present invention for the case 1 situation. Referring again to FIG. 5, it can be seen that for the upper part of the Group I curve, which increases gradually for $\beta_z$ as $B_z$ decreases, a decrease in the axial magnetic field strength $B_z$ causes a corresponding increase in $\beta_z$. Thus, a decreasing tapered axial field restores axial velocity to the electron which was lost via the FEL interaction. This is done by increasing the fraction of total electron velocity that is in the axial direction. Thus, additional kinetic energy can be extracted from the electron beam, and hence power output and efficiency are enhanced.

In respect to case 2, where $\Omega_o > k_w v_z$ (Group II) and $\Phi < 0$, the effect on $v_z$ is opposite to that in case 1, such that $v_z$ and $\beta_z$ of an electron traveling through the drift region gradually increases.

In order to make this understandable, it is observed that one consequence of the energy consideravtion relation is:

$$\frac{dv_z}{d\gamma} = \frac{c^2}{\gamma \gamma_z^2 v_z} \Phi,$$

which shows that when $\Phi < 0$, a decrease in energy results in an increase in axial velocity $v_z$. As can be seen from the Group II curve of FIG. 5, a decrease in $\beta_z$ causes a corresponding decrease in $\beta_z$. Thus a decreasing tapered axial field in case 2, acts to lower $\beta_z$, and thereby compensate for energy extraction from the electron via the FEL interaction.

Turning now to case 3, where $(\Omega_o > k_w v_z$ and $\Phi > 0)$, as a result of the FEL interaction, $v_z$ and $\beta_z$ decrease in a manner similar to that in case 1. As can be seen again from the Group II curve in FIG. 5, an increase in $B_z$ causes a corresponding increase in $\beta_z$. Therefore, an increasing tapered axial field in this case restores lost electron axial velocity.

In all of the above cases, the axial field is tapered within the uniform wiggler region such that electron beam energy extracted during the FEL interaction is compensated for by changing the fraction of the total velocity in the axial direction so as to oppose the change in axial velocity magnitude which occurs as electrons in the beam travel through the drift region.

The point within the drift region where the taper in axial field strength begins, as noted above, should be within the uniform wiggler region, wherein the wiggler magnetic field strength is of uniform and constant magnitude. For optimum efficiency, however, the taper in axial field strength should begin at the point in the drift region where the FEL interaction has nearly approached saturation. In the case of prebunched electron beams, this point could occur at the start of the uniform wiggler region.

While the previous discussion has been primarily concerned with the case in which a uniform wiggler region is present, the basic effect of the taper in the axial field strength on the efficiency enhancement is also operable in the presence of a nonuniform wiggler field, wherein the wiggler field is nonuniform throughout the drift region, as long as the taper in the axial field is within the wiggler field. The effect of the nonuniform wiggler field may also be to enhance the interaction efficiency. Thus, an optimization of the total efficiency enhancement due to the tapered axial field and the nonuniform wiggler field may also be possible.

A concrete example of the present invention will now be described which utilizes a decreasing tapered axial field for the case 2 situation. In the laser of the present example, a 1.25 MeV $(\gamma \sim 3.4)$, 1 kA, 6 mm diameter solid electron beam traverses an 11 mm i.d. stainless steel drift tube under the combined influence of an axial magnetic field and a transverse wiggler magnetic field. The electron beam is provided by a pulseline accelerator with 50 nsec pulse duration and $10^{-2}$ Hz maximum repetition rate. Through use of a special diode design, the electron beam is produced with an extremely low velocity spread $(\Delta\beta_z/\beta_z \leq 0.1\%)$. In this laser, a wiggler coil is provided which has tapered ends for producing a tapered wiggler field at the entrance and exit of the wiggler coil. The wiggler is tapered to insure adiabatic entry into, and exit from the interaction region.

The axial field $(B_z)$ is variable up to 20 kG and is used both to confine the electrons and to provide gyroresonant enhancement of the effects of the wiggler magnetic field. The wiggler magnet provides a helically varying transverse magnetic field $(B_r)$ of period $\lambda_w = 3$ cm and 0–2 kG amplitude over a uniform interaction region of 63 cm, with adiabatic transition regions at both ends. Special care was taken in the choice of $B_r$, $B_z$, and $\gamma$, since compatibility of these values is essential to produce the correct electron dynamics, and because of the great sensitivity of the output frequency to these experimental parameters.

Spontaneous emission at the injection end of the interaction region is highly amplified by the FEL interaction. The amplified radiation is then radiated into an anechoic chamber by means of a large (30 cm i.d.) microwave horn. Small fractions of this radiation are sampled by a pyroelectric detector with a high-pass filter, to monitor total power in the band of interest, and by a millimeter-wave grating spectrometer, in order to perform spectrally resolved measurements. The millimeter-wave grating spectrometer is equipped with three W-band crystal detectors, and is completely calibrated over the range 60 to 105 GHz. Its resolution is approximately 1 GHz. The use of three simultaneous channels in the spectrometer permits the efficient accumulation of spectra with a limited number of discharges. It also permits simultaneous observations at three discrete frequencies of the effect on the emission of any variation of experimental parameters.

The axial magnet coil in the above described apparatus comprises a series of "pancake" coils. Selected magnets may be disconnected in order to select where the effective end position of the axial magnet is located with respect to the wiggler magnet. As discussed above, the end of the axial magnet furthest from the electron source may be positioned near the end of the wiggler magnet to produce a tapered field within the uniform wiggler region. For purposes of the following discussion, position O corresponds to the axial position of the exit end of the wiggler magnet. Negative position values in cm are located toward the wiggler entrance end, and positive position values are located beyond the exit end.

Referring now to FIG. 8, a graph is shown wherein output power versus position of the last axial field coil is plotted for the apparatus described above. The peak power at 66 GHz appears to occur when the end of the axial field magnet is located near the end of the uniform wiggler section (−10 cm). A similar enhancement in emission as the length of uniform axial field is decreased (last axial field coil at −10 cm) is found at several other combinations of axial and wiggler fields.

Turning now to FIG. 9, there is shown a plotting of output power as a function of frequency for the laser of the present example, where $B_r=1.4$ kG. As shown, the dashed curve is that case obtained with a tapered axial field, whereas the solid curve is that case obtained with a uniform axial field. In both cases, $B_z=16.0$ k at the start of the interaction. In the tapered field case, the last axial field coil is positioned at about −10 cm. For these experimental parameters the total power in the emission spectrum appears to have increased by a factor of 2, accompanied by a small shift to lower frequencies. The pyroelectric detector data agrees with this factor of 2 increase in frequency-integrated power. For this case, shortening the region of uniform $B_z$ and creating the tapered end region increases the total high-frequency emission (f>60 GHz) measured by the pyroelectric detector by approximately 50% over that produced by any combination of wiggler field and uniform axial field. Based on a comparison with pyroelectric detector measurements performed at slightly higher currents and different axial and wiggler magnetic fields, whose total power and efficiencies were determined calorimetrically, this increases the estimated overall experimental power to near 50 MW at 5% efficiency. It should be noted that this results in larger experimental efficiencies than those predicted for the experiment, at lower axial fields and without an axial field end taper, by a particle-in-cell computer code that includes finite election velocity spread.

For a complete discussion of the above experimental apparatus, test results, and associated theory, reference is made to an article entitled "Study of gain, bandwith, and tunability of a millimeter-wave free-electron laser operating in the collective regime" by S. H. Gold, W. M. Black, H. P. Freund, V. L. Granatstein, R. H. Jackson, P. C. Efthimion, and A. K. Kinhead, *Phys. Fluids*, Vol. 26, No. 19, pp. 2683–2688, Sept. 1983, whose disclosure is herein incorporated by reference.

Thus, there is provided by the present invention a free electron laser having a tapered axial magnetic field which greatly enhances efficiency and power output. A power of about 50 MW at approximately 5% efficiency has been achieved with an embodiment of the present invention, as compared to typical powers of about 35 MW and efficiencies of about 2.5% in prior free electron lasers. A subsequent experiment showed a still higher efficiency of 6%, and also a higher power output of about 75 MW.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A free electron laser comprising:
   electron source means for injecting a beam of relativistic electrons in a predetermined direction into a drift region, each of said electrons while in said drift region having an axial velocity component parallel to said predetermined direction, the axial velocity component being a fraction of electron total velocity in the predetermined direction;
   wiggler magnet means for generating a spatially periodic transverse magnetic field in said drift region, said periodic magnetic field being of uniform and constant magnitude in a uniform wiggler region, wherein said periodic magnetic field interacts with the beam of electrons to generate an electron transverse velocity $v_w$ which is related to electron axial velocity $v_z$ by the magnitudes of the wiggler magnetic field and the axial magnetic field as defined by the formula $v_z^2 + v_w^2 = (1 - \gamma^{-2})c^2$ where $\gamma^{-2} = (1 - v^2/c^2)^{-2}$ and where v is the electron total velocity and where c is the speed of light and to cause the generation of coherent radiation, and wherein as a result of said interaction the axial velocity $v_z$ of each electron continuously changes in magnitude due to the change in total electron velocity v as each electron travels through said uniform wiggler region;
   axial magnet means for generating an axial magnetic field having an axial magnetic field strength within said drift region, said axial magnetic field being in a direction parallel to said predetermined direction, and wherein said axial magnetic field strength is tapered within said uniform wiggler region such that said axial magnetic field acts to change electron axial velocity $v_z$ so as to oppose said continuous change of axial velocity $v_z$ of each electron by changing the ratio of axial velocity $v_z$ to total velocity v.

2. A free electron laser as recited in claim 1, wherein said tapered axial magnetic field has a decreasing taper such that electrons in said beam experience a progressively decreasing axial magnetic field strength as they travel within said uniform wiggler region for the following cases: the case wherein $\Omega_o < k_w v_z$ and the case wherein $\Omega_o > k_w v_z$ and $\Phi < 0$, where $\Omega_o = |eB/\gamma mc|$, and $$\Phi = 1 - \beta_w^2 \gamma_z^2 \Omega_o / [(1+\beta_w^2)\Omega_o - k_w v_z]$$

where e is the electron charge, $B_z$ is the axial magnetic field strength, $\gamma$ is the relativistic factor $(1-v^2/c^2)^{-\frac{1}{2}}$, v is the total electron velocity, m is the electron's mass, c is the speed of light, $\beta_w \equiv v_w/v_z$, $v_w = \Omega_w v_z/(\Omega_o - k_w v_z)$, $v_z$ is the axial electron velocity, $k_w$ is the wiggler magnetic field wavenumber, $\Omega_w = |eB_r/\gamma mc|$, and $B_r$ is the wiggler magnetic field strength, $\gamma_z = (1-v_z^2/c^2)^{-\frac{1}{2}}$, wherein $v_w$=electron transverse velocity induced by the transverse magnetic field generated by the wiggler magnet means in the presence of the axial magnetic field, $\Omega_w$=the electron cyclotron frequency calculated with reference to the transverse magnetic field, $\Omega_o$=the electron cyclotron frequency calculated with reference to the axial magnetic field, and $\Phi$= a theoretical parameter calculated with reference to the terms $\beta_w$, $\gamma_w$, $\Omega_o$, $k_w$, and $v_z$.

3. A free electron laser as recited in claim 2, wherein said axial magnetic means comprises a solenoidal coil, said coil being coaxially positioned in respect to said drift region so that said coil surrounds said drift region.

4. A free electron laser as recited in claim 3, wherein said solenoidal coil has two ends, the end furthest from said electron source means being positioned in respect to said wiggler magnet means such that said tapered axial magnetic field exists within said uniform wiggler region.

5. A free electron laser as recited in claim 4, wherein said wiggler magnet means is a helical solenoidal coil coaxially positioned in respect to said drift region such that said helical solenoidal coil surrounds said drift region.

6. A free electron laser as recited in claim 1, wherein said tapered axial magnetic field has an increasing taper such that electrons in said beam experience a progressively increasing axial magnetic field strength as they travel within said uniform wiggler region for the case wherein $$\Omega_o k_w v_z$$

and $$\Phi > 0$$

where $\Omega_o = |eB_z/\gamma mc|$, and $$\Phi = 1 - \beta_w^2 \gamma_z^2 \Omega_o / [(1+\beta_w^2)\Omega_o - k_w v_z]$$

where e is the electron charge, $B_z$ is the axial magnetic field strength, $\gamma$ is the relativistic factor $(1-v^2/c^2)^{-\frac{1}{2}}$, v is the total electron velocity, m is the electron's mass, c is the speed of light, $\beta_w = v_w/v_z$, $v_w = \Omega_w v_z/(\Omega_o - k_w v_z)$, $v_z$ is the axial electron velocity, $k_w$ is the wiggler magnetic field wavenumber, $\Omega_w = |eB_r/\gamma mc|$ and $B_r$ is the wiggler magnet field strength, $\gamma_z = (1-v_z^2/c^2)^{-\frac{1}{2}}$, wherein $v_w$=electron transverse velocity induced by the transverse magnetic field generated by the wiggler magnet means in the presence of the axial magnetic field, $\Omega_w$=the electron cyclotron frequency calculated with reference to the transverse magnetic field, $\Omega_o$=the electron cyclotron frequency calculated with reference to the axial magnetic field, and $\Phi$=a theoretical parameter calculated with reference to the terms $\beta_w$, $\gamma_w$, $\Omega_o$, $k_w$, and $v_z$.

7. A free electron laser as recited in claim 6, wherein said axial magnet means comprises a solenoidal coil, said coil being coaxially positioned in respect to said drift region so that said coil surrounds said drift region.

8. A free electron laser as recited in claim 7, wherein said solenoidal coil includes a set of wire windings, a portion of said solenoidal coil having windings wich increase in density in the direction of travel of said electron beam thereby generating said increasing tapered axial magnetic field.

9. A free electron laser as recited in claim 8, wherein said wiggler magnet means is a helical solenoidal coil coaxially positioned in respect to said drift region such that said helical solenoidal coil surrounds said drift region.

10. A method of generating coherent radiation through a free electron laser interaction comprising the steps of:

injecting a beam of relativistic electrons in a predetermined direction into a drift region, each of said electrons while in said drift region having an axial velocity parallel to said predetermined direction, the axial velocity being a fraction of electron total velocity in the predetermined direction;

generating a spatial periodic transverse magnetic field being of uniform and constant magnitude in a uniform wiggler region, wherein said periodic magnetic field interacts with the beam of electrons to cause the generation of coherent radiation and wherein as a result of said interaction the magnitude of the axial velocity of each electron continuously changes as each electron travels through said uniform wiggler region;

generating an axial magnetic field having an axial magnetic field strength within said drift region, said axial magnetic field being in a direction parallel to said predetermined direction, and wherein said axial magnetic field strength is tapered within said uniform wiggler region such that said axial magnetic field acts to change the axial velocity so as to oppose said continuous change of axial velocity of each electron.

11. A free electron laser comprising:

electron source means for injecting a beam of relativistic electrons in a predetermined direction into a drift region, each of said electrons while in said drift region having an axial velocity component parallel to said predetermined direction, the axial velocity component being a fraction of electron total velocity in the predetermined direction;

wiggler magnet means for generating a spatially periodic transverse magnetic field in said drift region, said wiggler magnet means comprising a helical solenoidal coil axially positioned in respect to said drift region such that said coil surrounds said drift region, wherein said periodic magnetic field is of uniform and constant magnitude in a uniform wiggler region, and wherein said periodic magnetic field interacts with the beam of electrons to cause the generation of coherent radiation;

axial magnet means for generating an axial magnetic field having an axial magnetic field strength within said drift region, said axial magnet means comprising a solenoidal coil coaxially positioned in respect to said drift region such that said solenoidal coil surrounds said drift region, wherein said axial magnetic field is in a direction parallel to said predetermined direction, and wherein said axial magnetic field strength is tapered within said uniform wiggler region such that electrons in said beam experience a progressively decreasing axial magnetic field strength as they travel within said uniform wiggler region for the following cases: the case wherein $\Omega_o > k_w v_z$ and the case wherein $\Omega_o > k_w v_z$ and $\Phi < 0$, where $\Omega_o = eB_z/\gamma mc$, and $\Phi = 1 - \beta_w^2 \gamma_z^2 \Omega_o / [(1+\beta^2)\Omega_o - k_w v_z]$ where e is the electron charge, $B_z$ is the axial magnetic field strength, $\gamma$ is the relativistic factor $(1-v^2/c^2)^{-\frac{1}{2}}$, v is the total electron velocity, m is the electron's mass, c is the speed of light, $\beta_w = v_w/v_z$, $v_w = \Omega_w v_z/(\Omega_o - k_w v_v)$, $v_z$ is the axial electron velocity, $k_w$ is the wiggler magnetic field wavenumber, $\Omega_w = |eB_r/\gamma mc|$, and $B_r$ is the wiggler magnet field strength, $\gamma_z = (1-v_z^2/c^2)^{-\frac{1}{2}}$, wherein $v_w$ = electron transverse velocity induced by the transverse magnetic field generated by the wiggler magnet means in the presence of the axial magnetic field, $\Omega_w$ = the electron cyclotron frequency calculated with reference to the transverse magnetic field, $\Omega_o$ = the electron cyclotron frequency calculated with reference to the axial magnetic field, and $\Phi$ = a theoretical parameter calculated with reference to the terms $\beta_w$, $\gamma_z$, $\Omega_o$, $k_w$, and $v_z$.

12. A free electron laser comprising:

electron source means for injecting a beam of relativistic electrons in a predetermined direction into a drift region, each of said electrons while in said drift region having an axial velocity component parallel to said predetermined direction, the axial velocity component being a fraction of electron total velocity in the predetermined direction;

wiggler magnet means for generating a spatially periodic transverse magnetic field in said drift region, said wiggler magnet means comprising a helical solenoidal coil coaxially positioned in respect to said drift region such that said coil surrounds said drift region, wherein said periodic magnetic field is of uniform and constant magnitude in a uniform wiggler region, and wherein said periodic magnetic field interacts with the beam of electrons to cause the generation of coherent radiation;

axial magnet means for generating an axial magnetic field having an axial magnetic field strength within said drift region, said axial magnet means comprising a solenoidal coil coaxially positioned in respect to said drift region such that said solenoidal coil surrounds said drift region, wherein said axial magnetic field is in a direction parallel to said predetermined direction, and wherein said axial magnetic field strength is tapered withn said uniform wiggler region such that electrons in said beam experience a progressively increasing axial magnetic field strength as they travel within said uniform wiggler region for the case wherein $\Omega_o > k_w v_z$ and $\Phi > 0$, where $\Omega_o = |eB_z/\gamma mc|$, and $$\Phi = 1 - \beta_w^2 \gamma_z^2 \Omega_o / [(1+\beta_w^2)\Omega_o - k_w v_z]$$

where e is the electron charge, $B_z$ is the axial magnetic field strength, $\gamma$ is the relativistic factor $(1-v^2/c^2)^{-\frac{1}{2}}$, v is the total electron velocity, m is the electron's mass, c is the speed of light, $\beta_w = v_w/v_z$, $v_w = \Omega_w v_z/(\Omega_o - k_w v_z)$, $v_z$ is the axial electron velocity, $k_w$ is the wiggler magnetic field wavenumber, $\Omega_w = |eB_r/\gamma mc|$, and $B_r$ is the wiggler magnetic field strength, $\gamma_z = (1-v_z^2/c^2)^{-\frac{1}{2}}$, wherein $v_w$ = electron transverse velocity induced by the transverse magnetic field generated by the wiggler magnet means in the presence of the axial magnetic field, $\Omega_w$ = the electron cyclotron frequency calculated with reference to the transverse magnetic field, $\Omega_o$ = the electron cyclotron frequency calculated with reference to the axial magnetic field, and $\Phi$ = a theoretical parameter calculated with reference to the terms $\Omega_w$, $\gamma_z$, $\Omega_o$, $k_w$, and $v_z$.

* * * * *